United States Patent
He et al.

(10) Patent No.: US 9,893,565 B2
(45) Date of Patent: Feb. 13, 2018

(54) POWER RECEIVER CONTROL CIRCUIT, CONTROL METHOD OF WIRELESS POWER RECEIVER, AND ELECTRONIC APPARATUS

(71) Applicant: ROHM CO., LTD., Ukyo-ku, Kyoto (JP)

(72) Inventors: Xun He, Kyoto (JP); Daisuke Uchimoto, Kyoto (JP); Takeshi Nozawa, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 218 days.

(21) Appl. No.: 14/980,666

(22) Filed: Dec. 28, 2015

(65) Prior Publication Data
US 2016/0190818 A1    Jun. 30, 2016

(30) Foreign Application Priority Data

Dec. 26, 2014 (JP) .................................. 2014-265336

(51) Int. Cl.
H01F 27/42 (2006.01)
H02J 50/10 (2016.01)

(52) U.S. Cl.
CPC .................................. H02J 50/10 (2016.02)

(58) Field of Classification Search
CPC ....................................................... H02J 50/10
USPC .................................. 307/104–108; 361/139
See application file for complete search history.

(56) References Cited

U.S. PATENT DOCUMENTS

| 2013/0207481 A1* | 8/2013 | Gobburu | H04B 5/0037 307/104 |
| 2016/0241083 A1* | 8/2016 | He | H02J 50/10 |
| 2017/0201123 A1* | 7/2017 | Park | H02J 50/10 |

* cited by examiner

*Primary Examiner* — Thomas Skibinski
(74) *Attorney, Agent, or Firm* — Cantor Colburn LLP (57) ABSTRACT

A control circuit of a wireless power receiver where the wireless power receiver includes a reception coil, a rectification circuit that rectifies a current of the reception coil, and a smoothing capacitor connected to an output of the rectification circuit. The control circuit includes a frequency detecting part configured to determine a frequency of a signal received by the reception coil in a detection period after a lapse of predetermined first time from a predetermined start timing before a lapse of predetermined second time; a modulation detecting part configured to determine whether the signal received by the reception coil is subjected to FSK (Frequency Shift Keying); and a standard determining part configured to determine a standard that a wireless power transmitter complies with, depending on the frequency detected by the frequency detecting part and the presence or absence of FSK.

15 Claims, 6 Drawing Sheets

POWER RECEIVER CONTROL CIRCUIT, CONTROL METHOD OF WIRELESS POWER RECEIVER, AND ELECTRONIC APPARATUS

CROSS-REFERENCE TO RELATED APPLICATIONS

This application is based upon and claims the benefit of priority from Japanese Patent Application No. 2014-265336, filed on Dec. 26, 2014, the entire contents of which are incorporated herein by reference.

TECHNICAL FIELD

The present disclosure relates to wireless power supply technologies.

BACKGROUND

In recent years, wireless power supplies have become widespread as a method to supply electric power to electronic apparatuses. As a wireless power supply, there exist two types, i.e., an MI (Magnetic Induction) type and an MR (Magnetic Resonance) type. The MI type includes two standards, i.e., the standard "Qi" established by the WPC (Wireless Power Consortium) and a standard established by the PMA (Power Matters Alliance) (hereinafter referred to as the PMA standard), which are currently mainstream standards.

Figure 1:
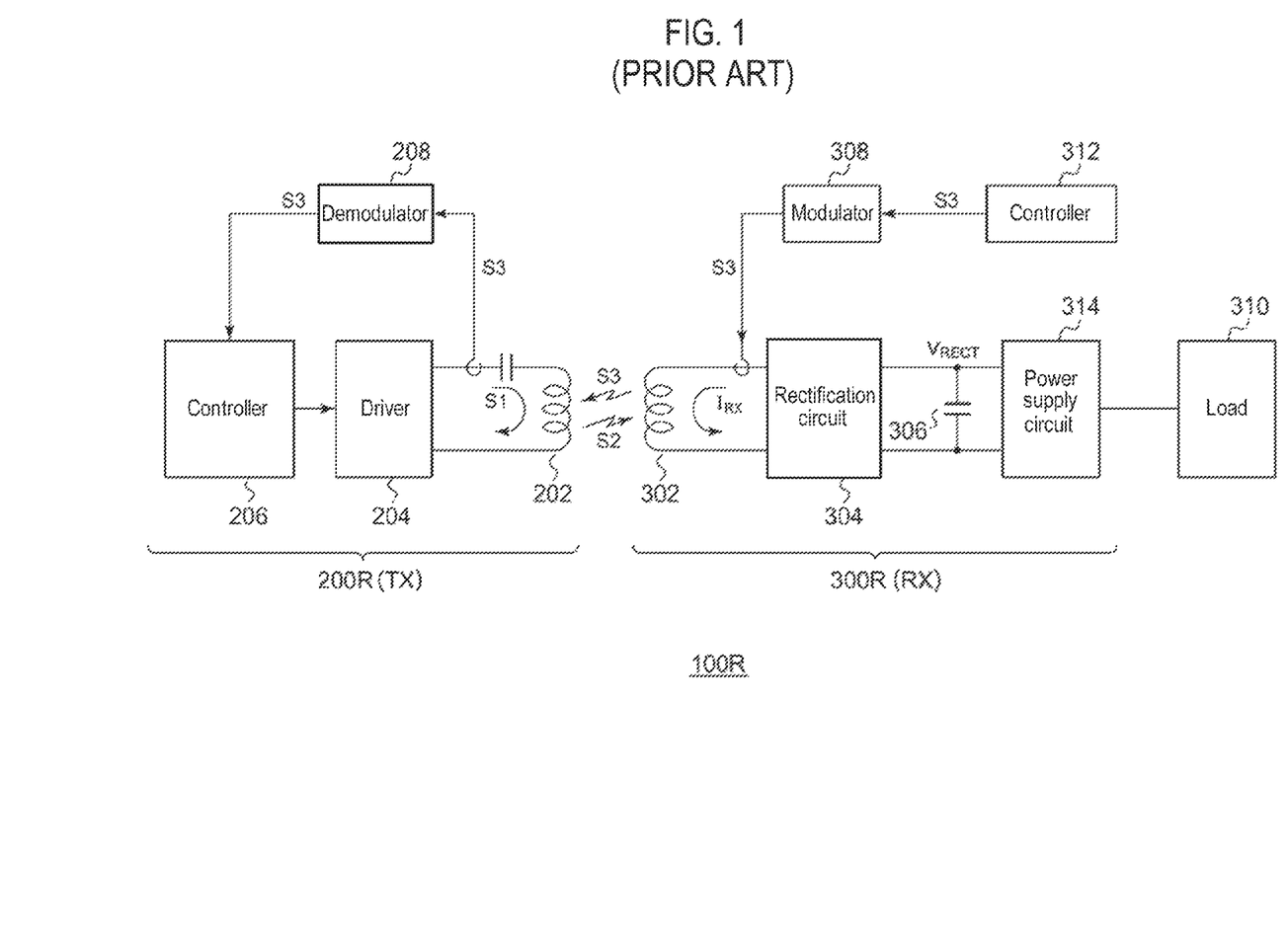
FIG. 1 is a diagram showing the configuration of a wireless power supply system in compliance with the PMA standard.

FIG. 1 is a diagram showing the configuration of a wireless power supply system 100R in compliance with the PMA standard. The power supply system 100R includes a power transmitter (TX) 200R and a power receiver (RX) 300R. The power receiver 300R is equipped in an electronic apparatus such as a mobile phone, a smartphone, an audio player, a game machine, a tablet terminal or the like.

The power transmitter 200R includes a transmission coil (primary coil) 202, a driver 204, a controller 206, and a demodulator 208. The driver 204 includes an H bridge circuit (full bridge circuit) or a half bridge circuit and applies a drive signal S1, specifically a pulse signal, to the transmission coil 202. An electromagnetic power signal S2 is generated in the transmission coil 202 by a drive current flowing through the transmission coil 202. The controller 206 generally controls the overall operation of the power transmitter 200R. Specifically, the controller 206 changes transmission power by controlling a switching frequency of the driver 204 or a duty cycle of switching.

The power receiver 300R includes a reception coil 302, a rectification circuit 304, a smoothing capacitor 306, a modulator 308, a load 310, a controller 312, and a power supply circuit 314. The reception coil 302 receives the power signal S2 of the transmission coil 202 and transmits a control signal S3 to the transmission coil 202. The rectification circuit 304/the smoothing capacitor 306 rectifies/smooths a current $I_{RX}$ induced in the reception coil 302 in response to the power signal S2 to convert the current $I_{RX}$ to a DC voltage $V_{RECT}$.

The power supply circuit 314 uses the power supplied from the power transmitter 200R to charge a secondary battery (not shown) or steps up or down the DC voltage $V_{RECT}$ to supply it to the controller 312 and the load 310.

In the PMA standard or Qi standard, a communication protocol is established between the power transmitter 200R and the power receiver 300R. Therefore, information can be delivered by the control signal S3 from the power receiver 300R to the power transmitter 200R. The control signal S3 is transmitted from the reception coil 302 (secondary coil) to the transmission coil 202 in the form of an FSK (Frequency Shift Keying) or ASK (Amplitude Shift Keying) signal by using backscatter modulation.

The control signal S3 contains power control data (also referred to as packets) indicating the amount of power supplied to the power receiver 300R, data indicating specific information of the power receiver 300R, and the like. The demodulator 208 demodulates the control signal S3 contained in the current or voltage of the transmission coil 202. The controller 206 controls the driver 204 based on the power control data contained in the demodulated control signal S3.

The PMA standard (parent standard) includes three children standards, i.e., PMA-1, PMA-3, and PMA-4. The inventors of the present application have examined the design of the power receiver 300R supporting the PMA-1, PMA-3, and PMA-4 standards and the Qi standard.

Since frequencies used in the PMA-1, PMA-3, and PMA-4 standards and the Qi standard are different from each other, communication cannot be established between the power transmitter 200R and the power receiver 300R until the standards (protocols) are determined. Therefore, the power receiver 300R requires the ability to automatically determine a standard which the power transmitter 200R complies with, without relying on means such as communication or the like, immediately after being placed on a charging stand of the power transmitter 200R.

SUMMARY

The present disclosure provides some embodiments of a power receiver which is capable of automatically determining a standard that a power transmitter complies with.

According to one embodiment of the present disclosure, there is provided a control circuit of a wireless power receiver. The wireless power receiver comprises a reception coil, a rectification circuit that rectifies a current of the reception coil, and a smoothing capacitor connected to an output of the rectification circuit. The control circuit comprises a frequency detecting part configured to determine a frequency of a signal received by the reception coil in a detection period after a lapse of predetermined first time from a predetermined start timing before a lapse of predetermined second time; a modulation detecting part configured to determine whether the signal received by the reception coil is subjected to FSK (Frequency Shift Keying); and a standard determining part configured to determine a standard that a wireless power transmitter complies with, depending on the frequency detected by the frequency detecting part and the presence or absence of FSK.

The wireless power supply system transitions from an analog ping phase, through a digital ping phase, to a power transfer phase to supply electric power from a power transmitter to a power receiver. Here, the frequency of a signal generated by the power transmitter after the start of the digital ping phase is changed to different frequencies or waveforms for different standards. Then, the wireless power receiver can automatically determine a standard that the power transmitter complies with, by determining a certain start timing, measuring a frequency in a predetermined period after the start timing, and detecting the presence or absence of FSK if necessary.

The standard determining part may (i) determine that the wireless power transmitter complies with the PMA (Power Matters Alliance)-1 standard if the detected frequency is higher than a first frequency that is set between 230 kHz and 250 kHz, and (ii) determine that the wireless power transmitter complies with the PMA-3 standard if the detected frequency is higher than a second frequency that is set between 190 kHz and 220 kHz and is lower than the first frequency and FSK is detected. In addition, the standard determining part may (iii) determine that the wireless power transmitter complies with the PMA-4 standard if the detected frequency is lower than the second frequency and FSK is detected, and (iv) determine that the wireless power transmitter complies with the Qi standard if the detected frequency is lower than the second frequency and no FSK is detected.

The standard determining part may (v) determine that the wireless power transmitter is an unknown wireless power transmitter if the detected frequency is higher than the second frequency and is lower than the first frequency and no FSK is detected.

The standard determining part may have at least two of the determination criteria (i) to (v).

The start timing may be a reset release. The reset release occurs in the power receiver. Therefore, when the frequency detection period is set on the basis of the timing of the reset release. It is possible to correctly detect different frequencies set for different standards.

The first frequency may be 240 kHz. The second frequency may be 200 kHz. By setting a threshold frequency substantially at the center of the frequency range of each standard, erroneous determination of standards may be prevented even if there exist a frequency measurement error or a frequency variation.

The standard determining part may (a) determine that the wireless power transmitter complies with the PMA (Power Matters Alliance)-1 standard if the detected frequency is higher than a third frequency that is set to be equal to or lower than 250 kHz, and (b) determine that the wireless power transmitter complies with the PMA-3 standard if the detected frequency is lower than a fourth frequency that is set to be equal to or higher than 230 kHz and is higher than a fifth frequency that is set to be equal to or lower than 220 kHz and FSK is detected.

The standard determining part may (c) determine that the wireless power transmitter complies with the PMA-4 standard if the detected frequency is lower than a sixth frequency that is set to be equal to or higher than 190 kHz, and (d) determine that the wireless power transmitter complies with the Qi standard if the detected frequency is lower than the sixth frequency and no FSK is detected.

The standard determining part may (e) determine that the wireless power transmitter is an unknown wireless power transmitter if the detected frequency is higher than the fifth frequency and is lower than the fourth frequency and no FSK is detected.

The standard determining part may have at least two of the determination criteria (a) to (e).

The standard determining part may include any combinations of the determination criteria (i) to (v) and (a) to (e).

The control circuit may be integrated on a single semiconductor substrate. As used herein, the term "integrated" is intended to include both of a case where all elements of a circuit are formed on a semiconductor substrate and a case where main elements of the circuit are integrated on the semiconductor substrate. In addition, some resistors, capacitors and the like for adjustment of a circuit constant may be provided outside the semiconductor substrate. By integrating the circuit as a single IC, it is possible to reduce a circuit area and allow circuit elements to have uniform characteristics.

According to another embodiment of the present disclosure, there is provided a wireless power receiver or an electronic apparatus including: a reception coil; a rectification circuit configured to rectify a current of the reception coil; a smoothing capacitor connected to an output of the rectification circuit; and the above-described control circuit.

Any combinations of the above-described elements or changes of the representations of the present disclosure between methods, apparatuses, and systems are effective as embodiments of the present disclosure.

DETAILED DESCRIPTION

Preferred embodiments will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "a member A is connected to a member B" is intended to include direct physical connection of the member A and the member B as well as indirect connection thereof via another member as long as the other member has no substantial effect on the electrical connection thereof or does not damage the functions or effects of the electrical connection thereof. Similarly, the phrase "a member C is provided between a member A and a member B" is intended to include direct connection of the member A and the member C or direct connection of the member B and the member C as well as indirect connection thereof via another member as long as the other member has no substantial effect on the electrical connection thereof or does not damage the functions or effects of the electrical connection thereof.

Figure 2:
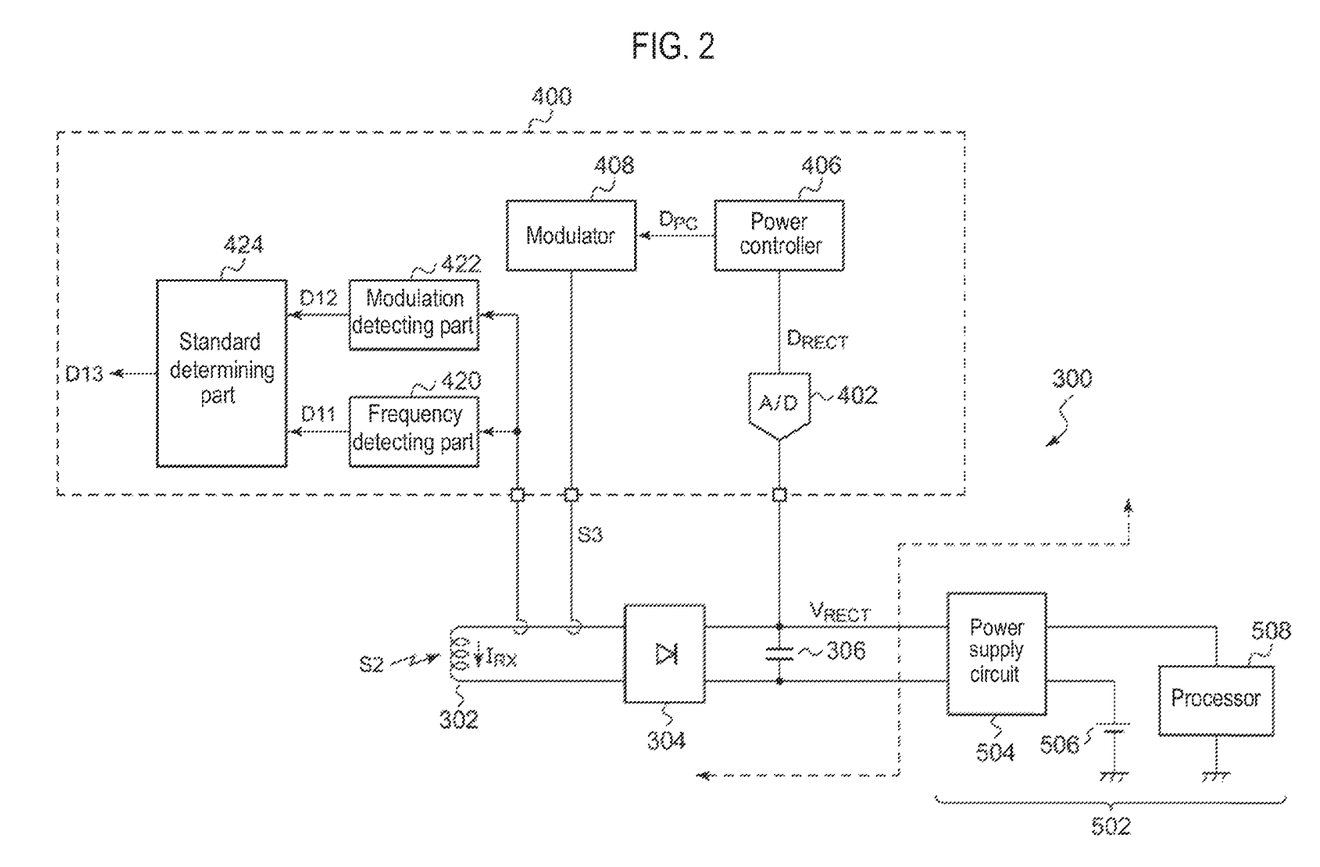
FIG. 2 is a block diagram of an electronic apparatus including a power receiver according to an embodiment.

FIG. 2 is a block diagram of an electronic apparatus 500 including a power receiver 300 according to an embodiment. The power receiver 300 receives a power signal S2 from a power transmitter (not shown), stores its energy in a smoothing capacitor 306, and supplies the stored energy to a load 502.

The power receiver 300 includes a reception coil 302, a rectification circuit 304, a smoothing capacitor 306, and a control circuit 400. The power receiver 300 of FIG. 2 is in compliance with the PMA standard and the Qi standard and can be used in the power supply system 100R of FIG. 1.

The reception coil 302 receives the power signal S2 from the transmission coil 202 (see FIG. 1) and transmits the control signal S3 to the transmission coil 202. A current $I_{RX}$ induced by the power signal S2 is flown through the reception coil 302. The input side of the rectification circuit 304 is connected to the reception coil 302 to full-wave or half-wave rectify the current $I_{RX}$. The rectification circuit 304 may be a diode bridge circuit or an H bridge circuit. The smoothing capacitor 306 is connected to an output of the rectification circuit 304 and smooths an output voltage of the rectification circuit 304. A DC voltage (also referred to as a rectification voltage) $V_{RECT}$ generated in the smoothing capacitor 306 is supplied to the load 502 at the subsequent stage.

The load 502 includes a power supply circuit 504, a secondary battery 506 and various processors 508. The power supply circuit 504 is provided because it is difficult to directly drive electronic circuits such as the processor 508 and the like by using the rectification voltage $V_{RECT}$. The power supply circuit 504 includes a linear regulator and/or a switching regulator (DC/DC converter) and regulates the rectification voltage $V_{RECT}$ to an appropriate voltage level which is then supplied to the processor 508. In addition, the power supply circuit 504 may include a charging circuit for charging the secondary battery 506 by using the power supplied from the power transmitter 200.

Subsequently, the control circuit 400 according to the embodiment will be described. The control circuit 400 includes a voltage measuring part 402, a power controller 406, a modulator 408, a frequency detecting part 420, a modulation detecting part 422, and a standard determining part 424 and is a functional IC (Integrated Circuit) integrated on a single semiconductor substrate. A portion of the rectification circuit 304 may be integrated in the control circuit 400. All the configurations of the control circuit 400 are not necessarily shown in FIG. 2 and blocks unrelated to the present disclosure are omitted for the sake of ease of understanding and simplicity of description.

The voltage measuring part 402 measures the rectification voltage $V_{RECT}$ generated in the smoothing capacitor 306 or a corresponding voltage. The voltage measuring part 402 may be an A/D converter for generating a digital value $D_{RECT}$ indicating the measured rectification voltage $V_{RECT}$.

The power controller 406 generates power control data $D_{PC}$, which indicates the power transmitted from the power transmitter, based on the rectification voltage $V_{RECT}$. For example, for the Qi standard, the power controller 406 quantizes an error between the rectification voltage $V_{RECT}$ and its desired point (DP) and generates the power control data $D_{PC}$.

For the PMA standard, an upper limit voltage $V_H$ and a lower limit voltage $V_L$ are set near the target level of the rectification voltage $V_{RECT}$. The power controller 406 compares the rectification voltage $V_{RECT}$ with the upper limit voltage $V_H$ and the lower limit voltage $V_L$ and generates the power control data $D_{PC}$ based on a result of the comparison. Specifically, the power controller 406 changes the power control data $D_{PC}$ in a first direction if the rectification voltage $V_{RECT}$ exceeds the upper limit voltage $V_H$, and changes the power control data $D_{PC}$ in a second direction if the rectification voltage $V_{RECT}$ is lower than the lower limit voltage $V_L$. In this embodiment, the first direction is a decreasing direction and the second direction is an increasing direction. The power controller 406 decreases the power control data $D_{PC}$ by one step if the rectification voltage $V_{RECT}$ exceeds the upper limit voltage $V_H$, and increases the power control data $D_{PC}$ by a plurality of steps if the rectification voltage $V_{RECT}$ is lower than the lower limit voltage $V_L$.

The modulator 408 generates a signal obtained by modulating the power control data $D_{PC}$ (FSK or ASK) and transmits the control signal S3 obtained by superimposing the modulated signal on the current $I_{RX}$ flowing through the reception coil 302.

The control circuit 400 has the ability to automatically determine whether or not the power transmitter 200 complies with one of the PMA-1, PMA-3, PMA-4, and Qi standards. To achieve this automatic determining ability, the control circuit 400 includes the frequency detecting part 420, the modulation detecting part 422, and the standard determining part 424.

The frequency detecting part 420 detects a frequency of the power signal S2 received by the reception coil 302 in a detection period $T_{DET}$ after the lapse of predetermined first time $\tau_1$ from a predetermined start timing before the lapse of predetermined second time $\tau_2$, and generates frequency data D11 indicating the detected frequency $f_{DET}$. A method of measuring the frequency is not particularly limited but may employ a technique known in the art, such as a frequency counter.

The modulation detecting part 422 determines whether or not the signal received by the reception coil 302 has been subjected to FSK (Frequency Shift Keying) in the detection period $T_{DET}$, and generates FSK determination data D12 indicating the presence or absence of FSK. The modulation detecting part 422 monitors a change with time in the frequency f (or the frequency data D11) detected by the frequency detecting part 420. If a frequency change is measured, it may be determined that the power signal has been subjected to FSK. Otherwise, if the frequency is consistent, it may be determined that the power signal has not been subjected to FSK.

The standard determining part 424 receives the frequency data D11 and the FSK determination data D12 and determines a standard which the wireless power transmitter 200 complies with, depending on the frequency f detected by the frequency detecting part 420 and the presence or absence of FSK determined by the frequency detecting part 420.

Hereinafter, a determination process performed by the standard determining part 424 will be described. The inventors of the present application have paid attention to a temporal change in the frequency of the power signal S2 generated by the power transmitter 200 immediately after a digital ping phase is started.

FIGS. 3A to 3D are diagrams showing the transition of frequency of a digital ping phase in the PMA-1, PMA-3, PMA-4, and Qi standards, respectively. In the PMA-1 standard of FIG. 3A, after the start of the digital ping phase, the frequency is gradually reduced from 480 kHz (frequency sweep). Thereafter, the frequency takes 250 kHz to 260 kHz over a period M_period.

Figure 3A:
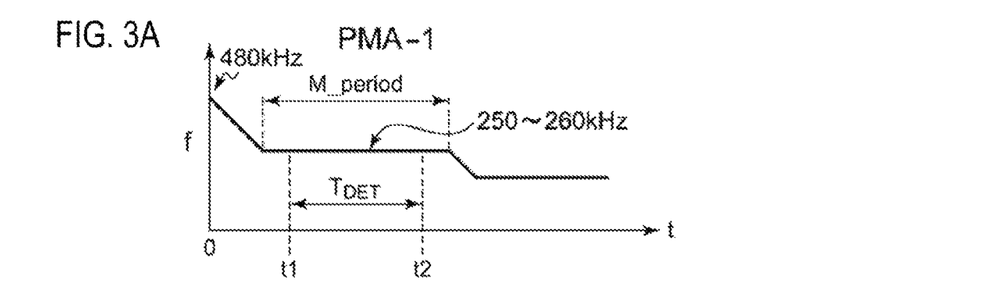
FIGS. 3A to 3D are diagrams showing the transition of frequency of a digital ping phase in the PMA-1, PMA-3, PMA-4, and Qi standards, respectively.
Figure 3B:
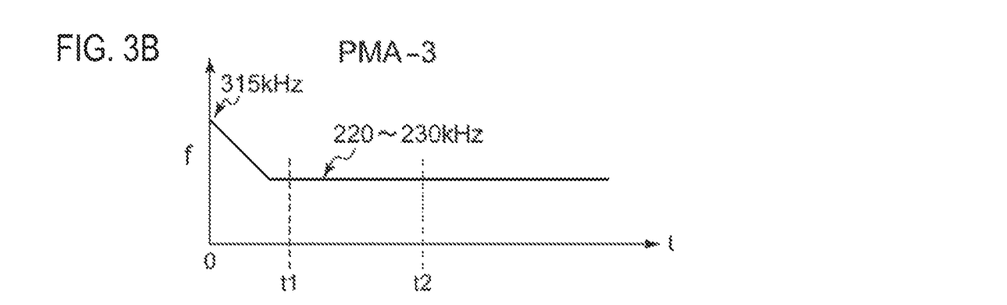
Figure 3C:
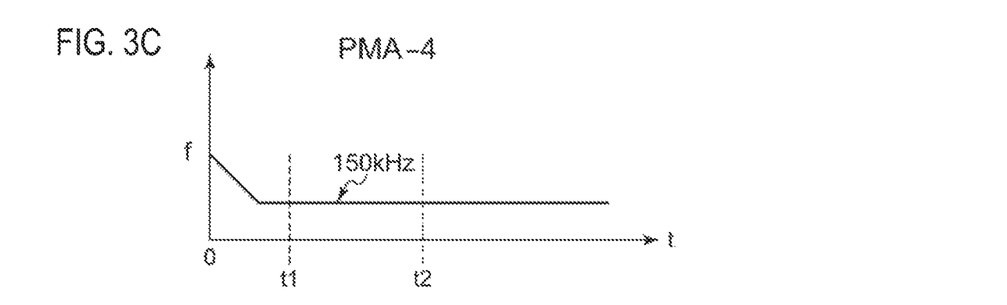
Figure 3D:
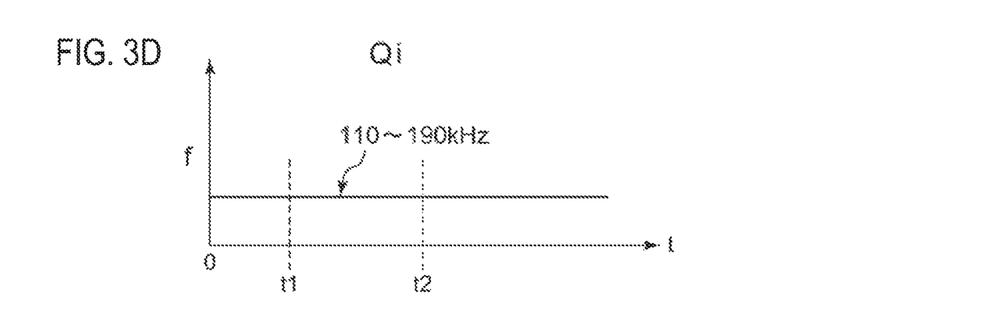

In the PMA-3 standard of FIG. 3B, after the start of the digital ping phase, the frequency is gradually reduced from 315 kHz. Thereafter, the frequency takes 220 kHz to 230 kHz over a period M_period. In the PMA-4 standard of FIG. 3C, the frequency is reduced from the start of the digital ping phase. Thereafter, the frequency takes 150 kHz over a period M_period. In FIG. 3D, the frequency can take 110 kHz to 190 kHz.

With attention paid to FIGS. 3A to 3D, in any standards, when a common detection period $T_{DET}$ (t1 to t2) is set to be included in the period M_period, the power signal S2 has a frequency or a frequency range corresponding to the respective standard within its time window. That is, it is possible to determine the standard by appropriately setting the detection period $T_{DET}$ and measuring the frequency in the detection period $T_{DET}$.

In the PMA-3 and PMA-4 standards, the power signal S2 is subjected to FSK in the period M_period. Therefore, it is possible to determine the standard by determining the presence or absence of FSK in the detection period $T_{DET}$.

At time t=0, the digital ping phase is started. In the power receiver 300, a reset is released when the digital ping phase is started. Therefore, when the start timing is taken to the reset release, the first time $\tau_1$ may be set to t1 and the second time $\tau_2$ may be set to t2. Therefore, the frequency detecting part 420 starts time measurement in response to the reset release and sets a period between time t1 after the lapse of the first time $\tau_1$ and time t2 after the lapse of the second time $\tau_2$ as the detection period (window) $T_{DET}$ of frequency and FSK.

As the detection period $T_{DET}$, for example, t1 and t2 are suitably 4 ms and 7 ms, respectively. t1 may be set to fall within a range from 3 to 5 ms and t2 may be set to fall within a range from 6 to 8 ms.

Figure 4:
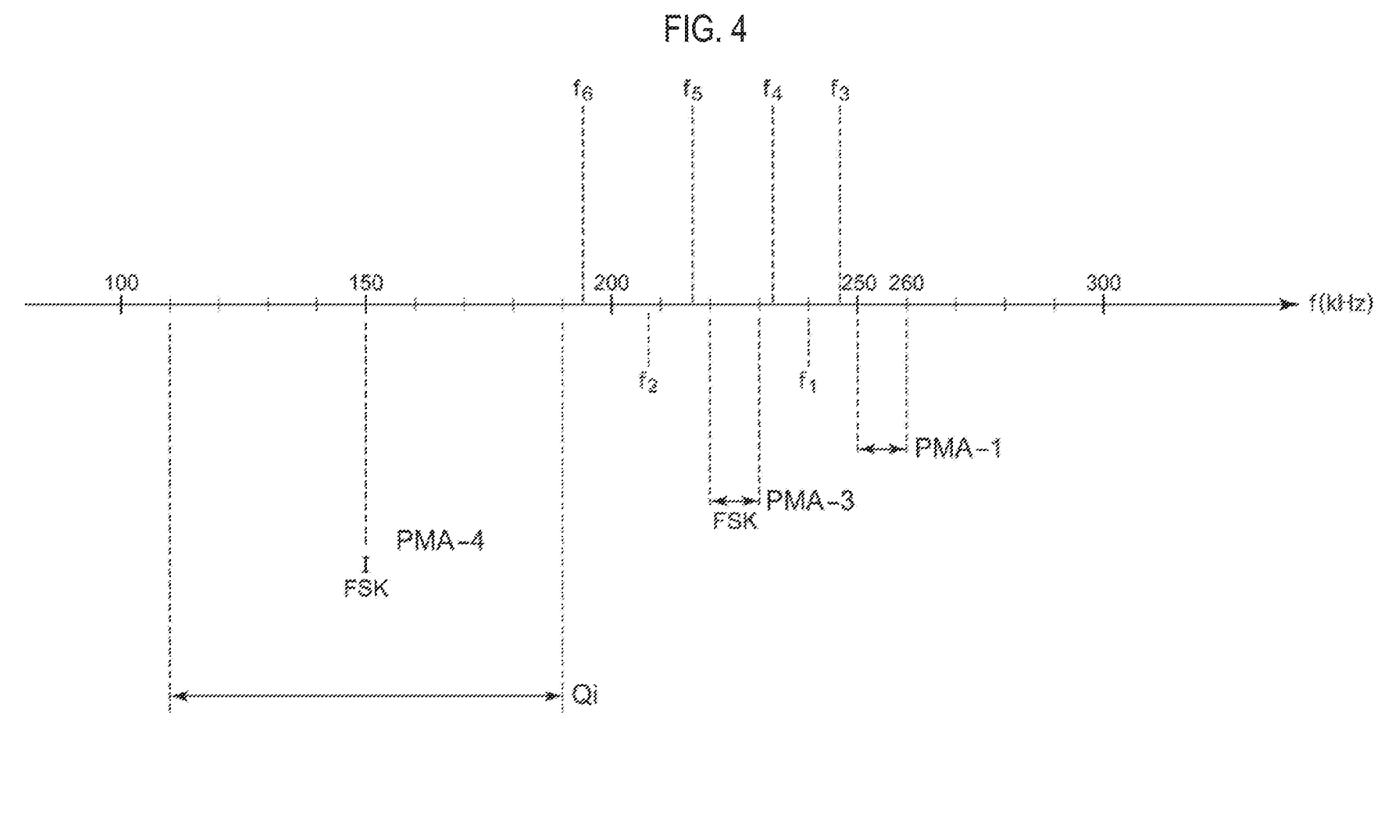
FIG. 4 is a diagram showing the correspondence relation between the standards and a frequency and the presence or absence of FSK in a detection period $T_{DET}$.

FIG. 4 is a diagram showing the correspondence relation between the standards and the frequency and the presence or absence of FSK in the detection period $T_{DET}$.

(i) If the frequency $f_{DET}$ detected in the detection period $T_{DET}$ is higher than a first frequency $f_1$ set between 230 kHz and 250 kHz, the standard determining part 424 determines that the wireless power transmitter complies with the PMA (Power Matters Alliance)-1 standard. For example, the first frequency $f_1$ is set at (or near) 240 kHz which corresponds to the center of the range from 230 kHz to 250 kHz.

(ii) If the detected frequency $f_{DET}$ is higher than a second frequency $f_2$ set between 190 kHz and 220 kHz and is lower than the first frequency $f_1$ and FSK is detected, the standard determining part 424 determines that the wireless power transmitter complies with the PMA-3 standard. For example, the second frequency $f_2$ is set at 200 kHz (or 205 kHz) near the center of the range from 190 kHz to 220 kHz.

(iii) If the detected frequency $f_{DET}$ is lower than the second frequency $f_2$ and FSK is detected, the standard determining part 424 determines that the wireless power transmitter complies with the PMA-4 standard. (iv) If the detected frequency $f_{DET}$ is lower than the second frequency $f_2$ and no FSK is detected, the standard determining part 424 determines that the wireless power transmitter complies with the Qi standard. (v) If the detected frequency $f_{DET}$ is higher than the second frequency $f_2$ and is lower than the first frequency $f_1$ and no FSK is detected, the standard determining part 424 determines that the wireless power transmitter is an unknown wireless power transmitter.

Figure 5:
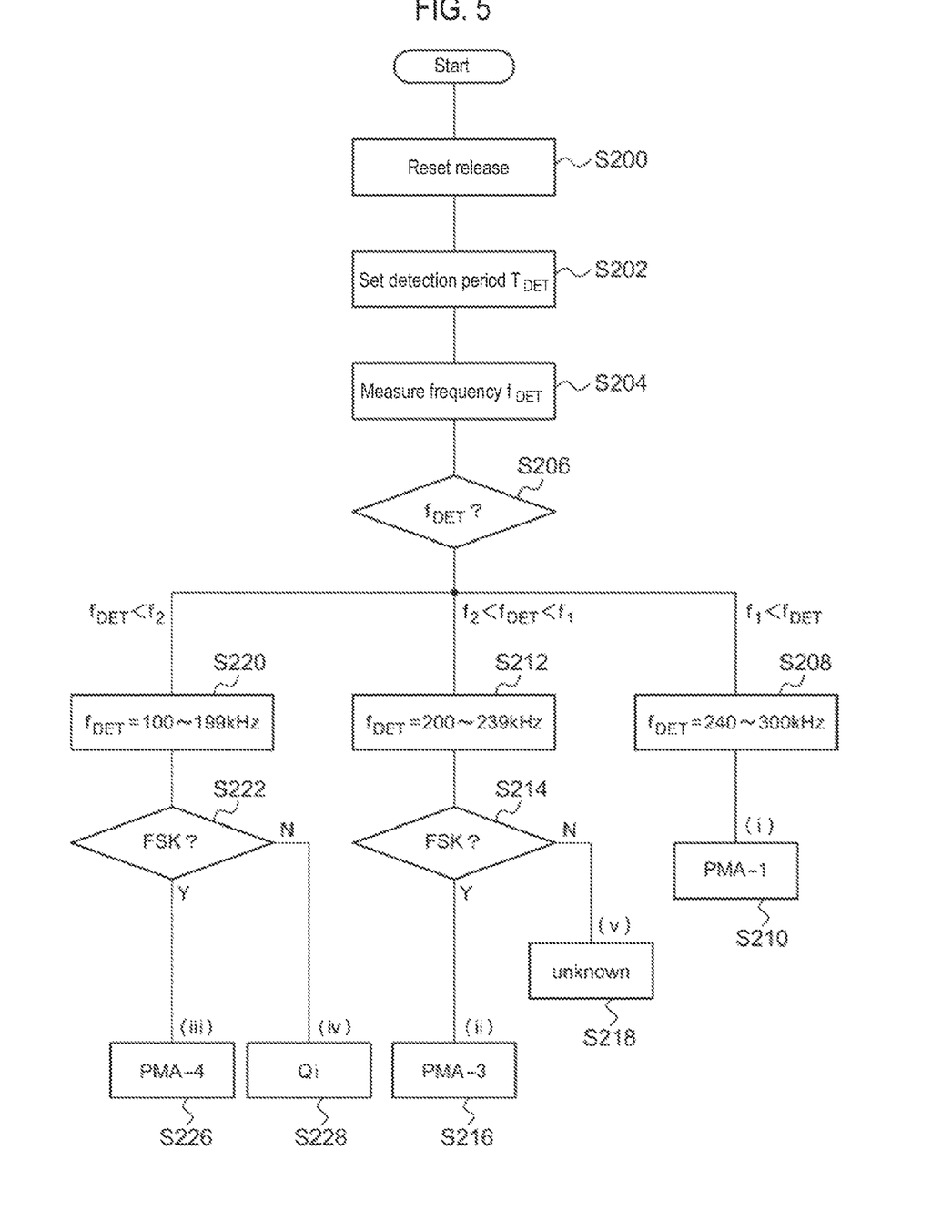
FIG. 5 is a flow chart of standard determination.

FIG. 5 is a flow chart of standard determination. When the reset release occurs (S200), the time measurement is started, the period between time t1 after the lapse of $\tau_1$ and time t2 after the lapse of $\tau_2$ is set as the detection period $T_{DET}$ (S202), and the frequency $f_{DET}$ is measured in the detection period $T_{DET}$ (S204). Then, a branching process based on the frequency $f_{DET}$ is performed (S206). If the frequency $f_{DET}$ is higher than the first frequency $f_1$ ($f_{DET}$=240 kHz to 300 kHz) (S208), it is determined that the wireless power transmitter complies with the PMA-1 standard (S210).

If the frequency $f_{DET}$ is higher than the second frequency $f_2$ and is lower than the first frequency $f_1$ ($f_{DET}$=200 kHz to 239 kHz) (S212), it is determined whether FSK is present or absent (S214). If FSK is detected (Y in S214), it is determined that the wireless power transmitter complies with the PMA-3 standard (S216). If no FSK is detected (N in S214), it is determined that the wireless power transmitter complies with an unknown standard (S218).

If the frequency $f_{DET}$ is lower than the second frequency $f_2$ ($f_{DET}$=100 kHz to 199 kHz) (S220), it is determined whether FSK is present or absent (S222). If FSK is detected (Y in S222), it is determined that the wireless power transmitter complies with the PMA-4 standard (S226). If no FSK is detected (N in S222), it is determined that the wireless power transmitter complies with the Qi standard (S228).

This control can automatically determine the PMA-1, PMA-3, PMA-4, and Qi standards.

(Use)

Figure 6:
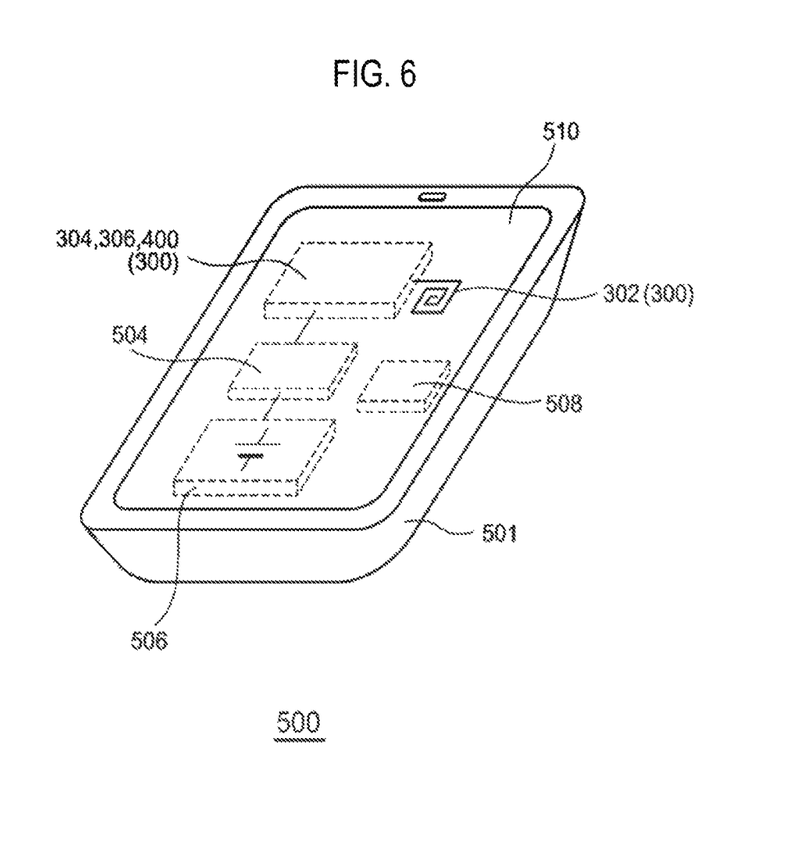
FIG. 6 is a diagram showing an electronic apparatus including the power receiver according to the embodiment.

Finally, an example of an electronic apparatus using the wireless power receiver 300 according to the embodiment will be described. FIG. 6 is a diagram showing an electronic apparatus 500 including the power receiver 300 according to the embodiment. Examples of the electronic apparatus 500 of FIG. 6 may include a smartphone, a tablet PC, a portable game machine, a portable audio player, and the like. A housing 501 of the electronic apparatus 500 contains a power supply circuit 504, a secondary battery 506, a processor 508, a display 510, and the above-described power receiver 300. The processor 508 may include an RF (Radio Frequency) part, a baseband processor, an application processor, an audio processor, and so on.

The present disclosure has been described above by way of embodiments. The above-described embodiments have been described for exemplary purposes only. It should be understood by those skilled in the art that various modifications to combinations of elements or processes may be made and such modifications fall within the scope of the present disclosure. Such modifications will be described below.

(Modification 1)

The determination algorithm by the standard determining part 424 is not limited to the combination of determination criteria (i) to (v) described in the embodiment. For example, two, three or four (i.e., at least two) of the determination criteria (i) to (v) may be employed and other criteria may be employed for the remaining standards.

(Modification 2)

Although it has been illustrated in the above embodiment that two frequencies $f_1$ and $f_2$, which are threshold values, are set to determine the standards, the present disclosure is not limited thereto. In Modification 2, four threshold values of third frequency $f_3$ to sixth frequency $f_6$ are set as shown in the upper portion of FIG. 4. The third frequency $f_3$ is set to be equal to or lower than 250 kHz, the fourth frequency $f_4$ is set to be equal to or higher than 230 kHz, the fifth frequency $f_5$ is set to be equal to or lower than 220 kHz, and the sixth frequency $f_6$ is set to be equal to or higher than 190 kHz.

Then, (a) when $f_{DET}>f_3$, it is determined that the wireless power transmitter complies with the PMA (Power Matters Alliance)-1 standard. When $f_5<f_{DET}<f_4$, (b) it is determined that the wireless power transmitter complies with the PMA-3 standard when FSK is detected and (e) it is determined that the wireless power transmitter complies with an unknown standard when no FSK is detected. When $f_{DET}<f_6$, (C) it is determined that the wireless power transmitter complies with the PMA-4 standard when FSK is detected and (d) it is determined that the wireless power transmitter complies with the Qi standard when no FSK is detected. This modification can provide stricter determination on the standards than the above embodiment.

Alternatively, the standard determining part 424 may employ two, three or four (i.e., at least two) of the determination criteria (a) to (e) and employ other criteria for the remaining standards.

As another alternative, the standard determining part 424 may determine a plurality of standards by combining the determination criteria (i) to (v) and the determination criteria (a) to (e).

As described above, there are many variations in the standard determination method, which fall within the scope of the present disclosure.

(Modification 3)

Although it has been illustrated in the above embodiment that the start timing serving as a reference for setting of the detection period $T_{DET}$ is reset-released, the present disclosure is not limited thereto. For example, the detection period $T_{DET}$ may be set based on events other than the reset release. The detection period $T_{DET}$ may be set to be included in the period M_period in which the frequency is stabilized, and the first time $\tau_1$ and the second time $\tau_2$ may be appropriately set in response to an event such as the start timing.

(Modification 4)

Although it has been illustrated in the above embodiment that the rectification voltage $V_{RECT}$ is converted to the digital value $D_{RECT}$ and the power controller 406 controls the power control data $D_{PC}$ according to the digital signal processing, the present disclosure is not limited thereto. In other words, all or some of the control of the power control data $D_{PC}$ may be performed according to analog signal processing. For example, a voltage comparator may be used for voltage comparison.

According to the present disclosure in some embodiments, it is possible to provide a power receiver which is capable of automatically determining a standard that a power transmitter complies with.

While certain embodiments have been described, these embodiments have been presented by way of example only, and are not intended to limit the scope of the disclosures. Indeed, the novel methods and apparatuses described herein may be embodied in a variety of other forms, furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a wireless power receiver, the wireless power receiver comprising:
   a reception coil;
   a rectification circuit that rectifies a current of the reception coil; and
   a smoothing capacitor connected to an output of the rectification circuit, the control circuit including:
   a frequency detecting part configured to determine a frequency of a signal received by the reception coil in a detection period after a lapse of predetermined first time from a predetermined start timing before a lapse of predetermined second time;
   a modulation detecting part configured to determine whether the signal received by the reception coil is subjected to FSK (Frequency Shift Keying); and
   a standard determining part configured to determine a standard that a wireless power transmitter complies with, depending on the frequency detected by the frequency detecting part and the presence or absence of FSK.

2. The control circuit of claim 1, wherein the standard determining part (i) determines that the wireless power transmitter complies with the PMA (Power Matters Alliance)-1 standard if the detected frequency is higher than a first frequency that is set between 230 kHz and 250 kHz, and (ii) determines that the wireless power transmitter complies with the PMA-3 standard if the detected frequency is higher than a second frequency that is set between 190 kHz and 220 kHz and is lower than the first frequency and FSK is detected.

3. The control circuit of claim 2, wherein the standard determining part (iii) determines that the wireless power transmitter complies with the PMA-4 standard if the detected frequency is lower than the second frequency and FSK is detected, and (iv) determines that the wireless power transmitter complies with the Qi standard if the detected frequency is lower than the second frequency and no FSK is detected.

4. The control circuit of claim 2, wherein the standard determining part (v) determines that the wireless power transmitter is an unknown wireless power transmitter if the detected frequency is higher than the second frequency and is lower than the first frequency and no FSK is detected.

5. The control circuit of claim 2, wherein the first frequency is 240 kHz.

6. The control circuit of claim 2, wherein the second frequency is 200 kHz.

7. The control circuit of claim 1, wherein the standard determining part (i) determines that the wireless power transmitter complies with the PMA (Power Matters Alliance)-1 standard if the detected frequency is higher than a first frequency that is set between 230 kHz and 250 kHz, (ii) determines that the wireless power transmitter complies with the PMA-3 standard if the detected frequency is higher than a second frequency that is set between 190 kHz and 220 kHz and is lower than the first frequency and FSK is detected, (iii) determines that the wireless power transmitter complies with the PMA-4 standard if the detected frequency is lower than the second frequency and FSK is detected, (iv) determines that the wireless power transmitter complies with the Qi standard if the detected frequency is lower than the second frequency and no FSK is detected, or (v) determines that the wireless power transmitter is an unknown wireless power transmitter if the detected frequency is higher than the second frequency and is lower than the first frequency and no FSK is detected, and wherein the standard determining part has at least two of the determination criteria (i) to (v).

8. The control circuit of claim 1, wherein the start timing is a reset release.

9. The control circuit of claim 1, wherein the standard determining part (i) determines that the wireless power transmitter complies with the PMA (Power Matters Alliance)-1 standard if the detected frequency is higher than a third frequency that is set to be equal to or lower than 250 kHz, and (ii) determines that the wireless power transmitter complies with the PMA-3 standard if the detected frequency is lower than a fourth frequency that is set to be equal to or higher than 230 kHz and is higher than a fifth frequency that is set to be equal to or lower than 220 kHz and FSK is detected.

10. The control circuit of claim 9, wherein the standard determining part (iii) determines that the wireless power transmitter complies with the PMA-4 standard if the detected frequency is lower than a sixth frequency that is set to be equal to or higher than 190 kHz and FSK is detected, and (iv) determines that the wireless power transmitter complies with the Qi standard if the detected frequency is lower than the sixth frequency and no FSK is detected.

11. The control circuit of claim 1, wherein the control circuit is integrated on a single semiconductor substrate.

12. An electronic apparatus comprising:
   a reception coil;
   a rectification circuit configured to rectify a current of the reception coil;
   a smoothing capacitor connected to an output of the rectification circuit; and
   the control circuit of claim 1.

13. A control method of a wireless power receiver for determining a standard that a wireless power transmitter complies with, comprising:
   determining a frequency of a signal received by a reception coil in a detection period after a lapse of predetermined first time from a predetermined start timing before a lapse of predetermined second time;
   determining whether the signal received by the reception coil is subjected to FSK (Frequency Shift Keying); and
   determining a standard that the wireless power transmitter complies with, depending on the detected frequency and the presence or absence of FSK.

14. The control method of claim 13, wherein determining a standard comprises:
   (i) determining that the wireless power transmitter complies with the PMA (Power Matters Alliance)-1 standard if the detected frequency is higher than a first frequency that is set between 230 kHz and 250 kHz; and
   (ii) determining that the wireless power transmitter complies with the PMA-3 standard if the detected frequency is higher than a second frequency that is set between 190 kHz and 220 kHz and is lower than the first frequency and FSK is detected.

15. The control method of claim 14, wherein determining a standard further comprises:
   (iii) determining that the wireless power transmitter complies with the PMA-4 standard if the detected frequency is lower than the second frequency and FSK is detected; and
   (iv) determining that the wireless power transmitter complies with the Qi standard if the detected frequency is lower than the second frequency and no FSK is detected.

* * * * *